US012723602B2

(12) United States Patent
Kloft

(10) Patent No.: US 12,723,602 B2
(45) Date of Patent: Sep. 1, 2026

(54) PRESSURE ACCUMULATOR

(71) Applicant: Hydac Technology GmbH, Sulzbach / Saar (DE)

(72) Inventor: Peter Kloft, Ransbach-Baumbach (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 366 days.

(21) Appl. No.: 18/580,888

(22) PCT Filed: Jul. 18, 2022

(86) PCT No.: PCT/EP2022/070096
§ 371 (c)(1),
(2) Date: Jan. 19, 2024

(87) PCT Pub. No.: WO2023/006482
PCT Pub. Date: Feb. 2, 2023

(65) Prior Publication Data

US 2025/0129802 A1 Apr. 24, 2025

(30) Foreign Application Priority Data

Jul. 28, 2021 (DE) ..................... 10 2021 003 898.3

(51) Int. Cl.
*F15B 1/10* (2006.01)
*F15B 1/08* (2006.01)
(Continued)

(52) U.S. Cl.
CPC ............ *F15B 1/103* (2013.01); *F15B 20/005* (2013.01); *G01M 3/04* (2013.01); *F15B 1/08* (2013.01);
(Continued)

(58) Field of Classification Search
CPC .......... F15B 1/08; F15B 1/103; F15B 20/005; F15B 2201/205; F15B 2201/3153;
(Continued)

(56) References Cited

U.S. PATENT DOCUMENTS 2,934,954 A 5/1960 Phillips ........................... 73/335
3,000,345 A * 9/1961 Gray, Jr. ............... G01P 13/008
220/663
(Continued)

FOREIGN PATENT DOCUMENTS

| | | | |
|---|---|---|---|
| GB | 2 018 360 | 10/1979 | ................ F15B 1/04 |
| WO | 2015 183933 | 12/2015 | .............. F16L 55/04 |
| WO | 2019 179800 | 9/2019 | ................ F15B 1/10 |

OTHER PUBLICATIONS

Search Report for International Application No. PCT/EP2022/070096, 5 pages, Oct. 24, 2022.

*Primary Examiner* — William M Mccalister
(74) *Attorney, Agent, or Firm* — Slayden Grubert Beard PLLC

(57) ABSTRACT

Pressure accumulator with an accumulator housing (10), in which a movable separating element (16) separates a medium space (12), preferably filled with a working gas, from a fluid space (14) in a fluid-tight manner, wherein a monitoring device (28) is provided and gives a visually perceptible indication when there is a fault that impairs the sealing effect of the separating element (16), the monitoring device having a viewing window through which it is possible to observe an indicator which is in connection with the medium space (12) and the optical property of which perceptibly changes when it is wetted with the fluid, characterized in that the monitoring device (28) has a screw plug, which can be screwed with its external thread into an assigned internal thread of the accumulator housing (10) and which has the viewing window and the indicator and also a
(Continued)

fluid-permeable shutting-off device, which forms in the screw plug a receiving space partly delimited by the viewing window and intended for receiving the indicator, the shutting-off device spatially separating the receiving space from the interior of the medium space (12) of the accumulator housing (10).

16 Claims, 3 Drawing Sheets

(51) Int. Cl.
*F15B 20/00* (2006.01)
*G01M 3/04* (2006.01)

(52) U.S. Cl.
CPC . *F15B 2201/205* (2013.01); *F15B 2201/3153* (2013.01); *F15B 2201/415* (2013.01); *F15B 2201/50* (2013.01); *F15B 2201/615* (2013.01)

(58) Field of Classification Search
CPC ............ F15B 2201/50; F15B 2201/415; F15B 2201/615; G01M 3/04
See application file for complete search history.

(56) References Cited

U.S. PATENT DOCUMENTS 3,067,015 A * 12/1962 Lawdermilt ......... G01N 21/783 435/287.7
3,100,691 A * 8/1963 Jones ................... G01N 31/222 422/402
3,142,287 A * 7/1964 Jones ................... G01N 31/222 116/276
4,063,452 A * 12/1977 Bradshaw ............ G01N 31/222 73/73
4,201,080 A * 5/1980 Slepak ................. A01G 25/167 73/73
4,793,180 A 12/1988 Stewart et al. ................. 73/335
5,383,338 A * 1/1995 Bowsky .................. G01F 23/02 116/276
6,576,473 B1 * 6/2003 Scaringe ................ G01N 21/80 436/39
11,268,541 B2 * 3/2022 Baltes ................... G01M 3/042
2015/0345802 A1 * 12/2015 Van Haaren .......... G01M 3/042 220/721
2016/0258449 A1 * 9/2016 Lehnert ................... F15B 1/103

* cited by examiner

PRESSURE ACCUMULATOR

CROSS-REFERENCE TO RELATED APPLICATIONS

This application claims priority to German Patent Application No. DE 10 2021 003 898.3, filed on Jul. 28, 2021 with the German Patent and Trademark Office. The contents of the aforesaid patent application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to a pressure accumulator with an accumulator housing, in which a movable separating element separates a medium space, for example filled with a working gas, from a fluid space in a fluid-tight manner, wherein a monitoring device is provided, which gives a visually perceptible indication when there is a fault that impairs the sealing effect of the separating element, the monitoring device having a viewing window through which it is possible to observe an indicator which is in connection with the medium space and the optical property of which perceptibly changes when it is wetted with the fluid.

WO 2019/179800 A1 discloses a generic pressure accumulator in which the indicator that changes its optical properties is received in a capsule, the wall of said capsule being permeable to allow fluid to pass through and said capsule being arranged between the viewing window and the separating element in the accumulator housing. In the known solution, this permits a space-saving design of the entire monitoring device as the capsule with the indicator received therein has a reduced construction height. The indicator in capsule form and the fluid-permeable shutting-off device, by means of which the indicator in capsule form is held in position in a receiving space, and the viewing window are arranged separately, one behind the other, in a sleeve-shaped receiving socket on the upper side of the accumulator housing. In this case, the viewing window is metal-fused to the wall of the accumulator housing such that the monitoring device in its entirety is provided so that it can be permanently received in the accumulator housing and is thus an integral part of the accumulator housing. Furthermore, in the known solution an additional sealing body is arranged next to the monitoring device on the upper side of the accumulator housing, which allows a filling port in the associated housing wall, which is provided to fill the medium space with a working gas, particularly in the form of nitrogen gas, to be sealed in a gas-tight manner. In addition to increased manufacturing effort to fit the filling port into the accumulator housing wall and seal said wall by means of the sealing plug, said plug is often formed by a soft solder which is not very resilient, with the result that undisrupted operation is not always guaranteed, especially in high-pressure applications. Furthermore, the filling effort involved in refilling the medium space with the working gas is increased because the soft solder of the sealing plug first needs to be removed in a relatively complex manner and then reapplied to the filling port in a sealing manner after the filling operation.

SUMMARY

A need exists to provide an improved pressure accumulator such that the manufacturing effort is reduced and/or filling and refilling operations with working gas on the so-called gas side of the pressure accumulator are made easier.

The need is addressed by the subject matter of the independent claim(s). Embodiments of the invention are described in the dependent claims, the following description, and the drawings.

DESCRIPTION

Figure 1:
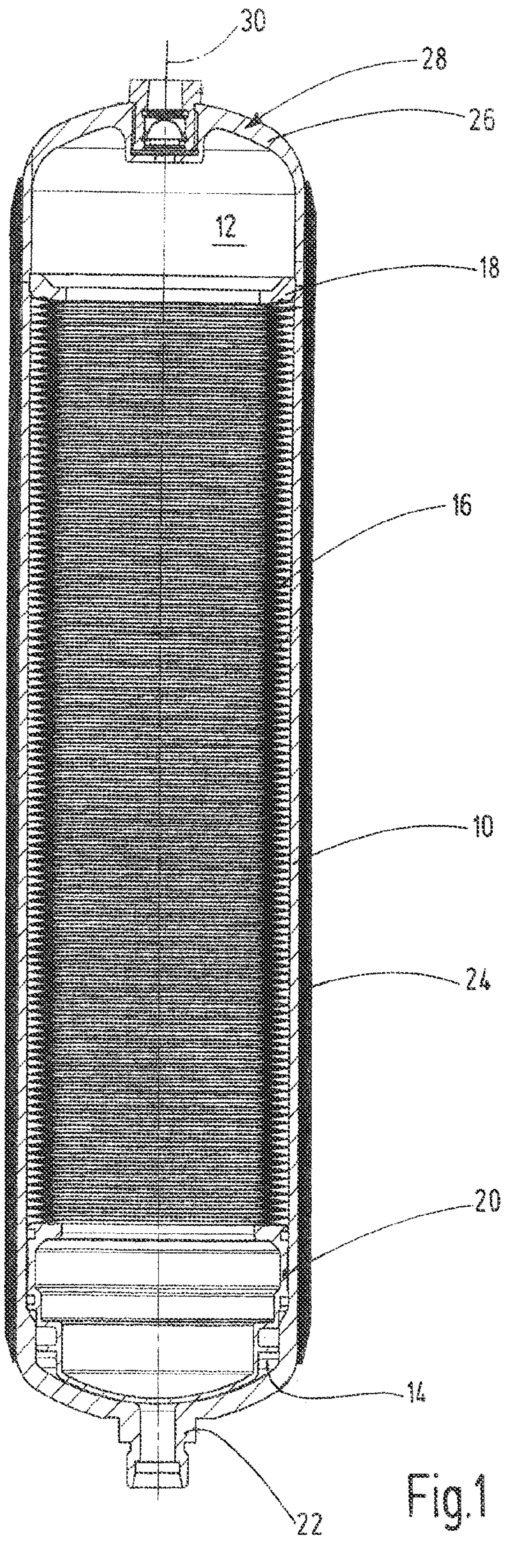
FIG. 1 shows a longitudinal section through an embodiment of a pressure accumulator with an inserted screw plug.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, the monitoring device has a screw plug which can be screwed with its external thread into an assigned internal thread of the accumulator housing and which has the viewing window and the indicator and also a fluid-permeable shutting-off device, which forms, in the screw plug, a receiving space partly delimited by the viewing window and intended for receiving the indicator, the shutting-off device spatially separating the receiving space from the interior of the medium space of the accumulator housing, all essential components of the monitoring or indicator device are received in one component, specifically the screw plug, with the result that, by means of the associated screw fitting, usually in the form of an internal thread in the accumulator housing, which delimits a filling port, when the screw plug is correspondingly removed, this facilitates both an initial filling of the gas side of the pressure accumulator with the working gas and also, if necessary, corresponding refilling operations. As the components of the monitoring device are centrally integrated in one location in the associated screw plug, the solution according to the teachings herein has a small design and has proved to be extremely stable under pressure.

As the screw plug is able to absorb very high compressive forces, this also ensures a no-fail closure solution when the pressure accumulator is used in high-pressure applications without the need to weaken the accumulator housing by using separate filling ports that also need to be sealed, as disclosed in the prior art. To ensure pressure-resistant and pressure-tight closure options for the accumulator housing by means of the screw plug, it is also provided that said screw plug, which is designed as a hollow screw, comprises, at least in the region of the screw head, a receptacle in the form of a truncated cone for receiving the viewing window, the obliquely extending conical wall of said receptacle enclosing an acute angle when notionally extended with the longitudinal axis of the accumulator housing with respect to the environment and, furthermore, that the viewing window, for example made from borosilicate glass, is metal-fused to the metal material of the screw plug.

In some embodiments, it is also provided that the glass of the viewing window breaks if a pre-definable target pressure threshold is exceeded, said threshold lying between a test pressure and a bursting pressure, and that the corresponding sight glass disintegrates into extremely small fragments in the event of failure or bursting. Unlike a metallic sealing solder according to the prior art, which in some cases shatters in a projectile manner into the environment in the event of failure, any risk to the environment is avoided by using glass that disintegrates and remains primarily in the screw plug.

In some embodiments, it is provided that the indicator can be moved freely within the receiving space. As such, in the event of failure, the indicator is supported on the underside of the viewing window, which reduces the optical observation distance with the result that the indicator display can be read more easily. As such, this also prevents the indicator being destroyed in unfavourable conditions in the event of failure with a high pressure surge in the receiving space, after which there would be no further indicator display.

In some embodiments, it is provided that the receptacle in the form of a truncated cone, with the viewing window, transitions into an annular groove-shaped widening in the screw plug, which is part of the receiving space for the indicator. The annular groove-shaped widening creates a larger receiving space for the indicator inside the screw plug, with the result that, if any relevant bursting pressures arise from the pressure accumulator, these are also conveyed into the widening, such that, although this may lead to an increased pressure loading on the metallic material of the screw plug, it also ensures substantial pressure relief for the glass-type viewing window, which is also securely anchored in the screw plug due to the conical nature of the receptacle in said plug and, as such, is retained even in the event of high bursting pressures, with the result that the viewing window is unlikely to be unintentionally discharged in projectile form.

To ensure improved sealing, it is for example conceivable that the screw plug is provided with an additional sealant in the top and/or in the bottom region in relation to the respective transition to the accumulator housing and, furthermore, it is possible to anchor the screw plug to the accumulator housing by applying an additional weld seam.

Once the indicator has been used up, for example because it has displayed a fault by changing colour, the entire screw plug together with the used indicator merely needs to be replaced by a correspondingly designed new screw plug after corresponding maintenance or repair work on the pressure accumulator in order to render the entire configuration functional again, which has proved to be extremely cost-effective.

The teachings herein also relates to a screw plug, in particular for a pressure accumulator, wherein the following are provided in a screw housing as integral components of said housing:

a viewing window, an indicator, and a device, which is designed to be fluid-permeable and holds the indicator in a receiving space of the screw housing.

Other embodiments of the pressure accumulator are described in the dependent claims. Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS.

DETAILED DESCRIPTION

FIG. 1 shows a pressure accumulator in the form of a longitudinal section with an accumulator housing 10 with a medium space 12 filled with a working gas, such as nitrogen gas, and a fluid or liquid space 14, said spaces being separated in a fluid-tight manner by means of a movable separating element 16. In the present embodiment, the separating element 16 is formed by a bellows, as is known per se, said bellows, when viewed as shown on FIG. 1, being fixed at its upper end inside the accumulator housing 10 by means of a fixing ring 18 and the opposite lower end being articulated at a guide device 20 in the form of a half-shell, said guide device in this respect being able to be moved up and down along the inside of the accumulator housing 10 together with the bellows as a separating element 16; as a function of the respective fluid pressure prevailing at a connection point 22, by means of which the accumulator can be connected to a fluid circuit, for example in the form of a hydraulic circuit, which is not shown in greater detail. In this manner, the movable separating element 16, which is supported on its inner side with respect to the gas pressure in the medium space 12, is able to store hydraulic energy; however, it can also smooth out pressure pulses on the fluid side. Further embodiments of such pressure accumulators are possible, although these are standard, which means that they are not described in further detail at this point. Instead of a bellows, a different separating element 16 (not shown) can of course also be used for a pressure accumulator, for example in the form of a membrane bladder or a piston accumulator arrangement.

Furthermore, in the present case, the wall of the accumulator housing 10 is designed to be exceptionally thin such that, in the present embodiment of a pressure accumulator, the cylindrical wall part of the accumulator housing 10 is furnished with a reinforcement 24 on its outer circumference, said reinforcement being made up of fibre layers or a fibre winding, for example. As such, the accumulator housing 10 and thus the pressure accumulator can be reinforced so that said pressure accumulator can also be used for high-pressure applications.

Figure 2:
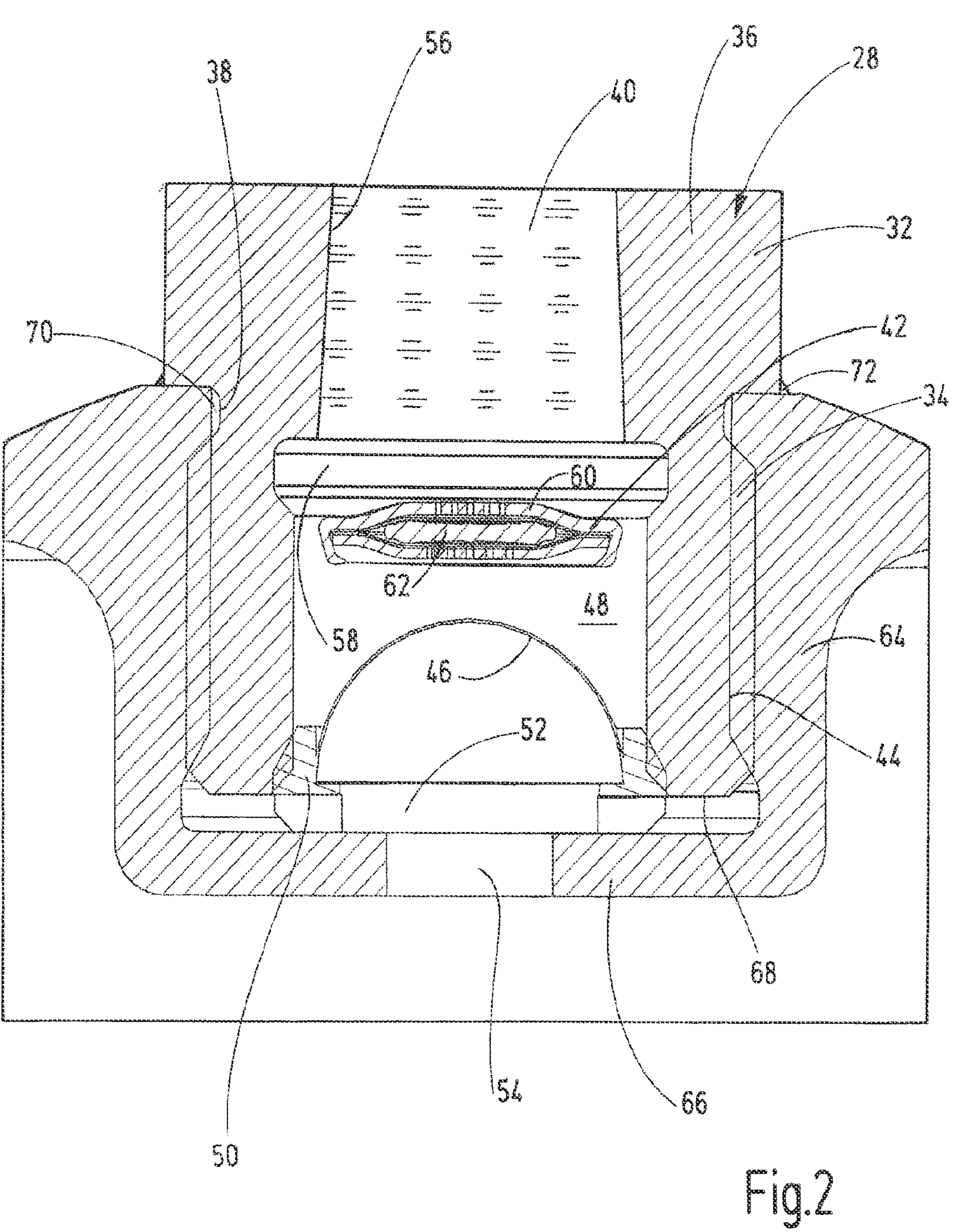
FIG. 2 is an enlarged representation of a detail of the screw plug inserted in the accumulator housing according to the image in FIG. 1.
Figure 3:
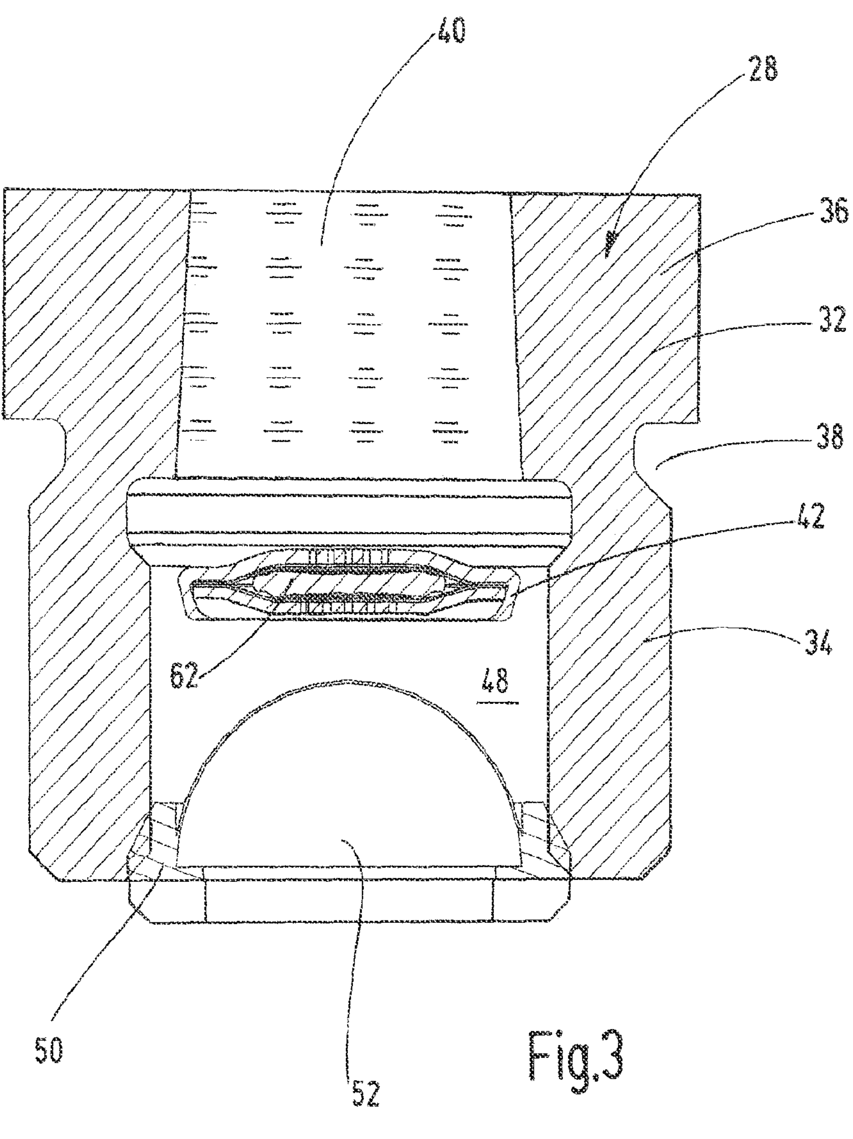
FIG. 3 shows the screw plug inserted in FIGS. 1 and 2 as such.

A monitoring device, which is referred to in its entirety as 28, is fitted on the upper side of the accumulator housing 10, which forms a kind of accumulator lid 26 with a domed shape, said monitoring device being shown in more detail in FIGS. 2 and 3. The monitoring device 28 is arranged concentrically with respect to a longitudinal axis 30 of the accumulator housing 10, which is designed to be rotationally symmetrical with respect to said longitudinal axis 30. The monitoring device 28 comprises, as a housing body, a screw plug 32, which is designed as a hollow screw. The screw plug 32 is divided into a bottom region with an external thread 34 and a top region with a screw head 36, which is used to fix the screw plug 32 in the accumulator housing 10 by means of standard actuating tools (not shown), such as a wrench, for example.

A thread run-out 38 is arranged between the outer thread 34 and the screw head 36. Moreover, as shown on FIGS. 2 and 3, the screw plug 32 is designed as a plug or stopper, in other words the height of the screw plug 32 is also substantially the same as its width, which contributes to pressure stability, including of the overall arrangement of the accumulator housing 10 with screw plug 32. The screw plug 32 comprises a viewing window 40, which ends flush with the upper side of the screw plug 32 in the region of the screw head 36. An indicator 42 can be observed by means of the viewing window 40, said indicator being connected to the medium space 12 and having an optical property that perceptibly changes when it is wetted with fluid originating from the fluid space 14. If, for example, the respective separating element 16 fails due to rupture, liquid flows from the fluid space 14 towards the medium space 12 and from there onwards to the indicator 42, which then, by changing colour, makes an observer aware that the pressure accumulator has failed. The corresponding optical monitoring can be carried out by maintenance staff, however it is also possible to use a camera monitoring system (not shown) to automate procedures in this case.

As shown by FIGS. 1 and 2 in particular, the monitoring device 28 in the form of the screw plug 32 is screwed with its outer thread 34 into an internal thread 44 of the accumulator housing 10, wherein the screw plug 32 comprises a fluid-permeable shutting-off device 46 on its lower side, as viewed in the figures, said shutting-off device, in the direction of a receiving space 48 for the indicator 42 inside the screw plug 32, being pre-formed in a dome-like or hemispherical manner towards the viewing window 40. The associated shutting-off device 46, which is formed by a sieve or membrane structure, is held in position by means of an insert ring 50 which is formed, for example pressed into, the lower end of the screw plug 32 or is a component of the screw plug 32 that can be detached by means of a screw fitting which is not shown in greater detail. By virtue of the dome-like or hemispherical configuration of the fluid-permeable shutting-off device 46, increased pressure surges originating from the medium space 12 and projecting in the direction of the receiving space 48 can be absorbed and compensated for the indicator 42 under this protection.

The aforementioned receiving space 48 with the indicator 42 is partly delimited at the top by the lower side of the viewing window 40 and from the outside by the inner circumferential wall portions of the screw plug 32, and, as viewed on the figure, at the bottom by the shutting-off device 46, which thus creates a spatial separation between the medium space 14 and the receiving space 48. As such, the insert ring 50 is furnished with a passage point 52, which is arranged coaxially with respect to a further passage point 54 in the accumulator housing 10 and, in this manner, creates the fluid connection between the medium space 12 and the receiving space 48. As such, the passage point 52, and the further passage point 54, is also arranged concentrically with respect to the longitudinal axis 30 of the accumulator housing 10.

The aforementioned viewing window 40 consists of a glass, for example of borosilicate glass, which is metal-fused to the material of the screw plug 32. The quality of the glass in the viewing window is in any event selected such that the glass breaks at a pre-definable target pressure threshold in the receiving space 48 in the event of failure, said threshold lying between a pre-definable test pressure and a bursting pressure, wherein said glass disintegrates into extremely small fragments inside the screw plug 32 in the event of failure and, as such, does not leave the screw head 36 of the screw plug 32. At the top, the screw plug forms a receptacle 56 in the form of a truncated cone on the inside of the screw head 36, the aforementioned pitch leading to a widening of the viewing window 40 on the side of the receiving space 48, with the result that the viewing window 40 is held securely, in a plug-like manner, in the screw plug 32, in the screw head 36 thereof, such that, even at high pressures inside the receiving space 48, the viewing window 40 is securely held in the screw plug 32 and cannot be discharged outwards into the environment in a projectile manner. Due to the truncated cone shape of the receptacle 56 along with the assigned viewing window 40, which form a cross-section that narrows towards the outside, it is possible to ensure that disintegrating glass fragments cannot be discharged outwards to the environment in the event of failure. It is therefore provided that the upper side of the viewing window 40 ends flush with the free end face of the screw head 36.

The aforementioned receptacle 56 in the form of a truncated cone, with the viewing window 40, transitions into an annular groove-shaped widening 58 in the screw plug 32, which is part of the receiving space 48 for the indicator 42. The annular groove-shaped widening 58 comprises a free through-section which is larger than the outer diameter of the indicator 42 at its widest point and can thus receive the indicator 42, which can move freely inside the receiving space 48, in the event of failure, wherein the indicator 42 can be supported on the lower side of the viewing window 40, which reduces the optical observation distance such that the indicator display can be read more easily.

The indicator 42 comprises a fluid-permeable capsule 60, which consists of two circular blanks, the upper of which is placed on and along the outer circumference of the lower circular blank forming a beaded rim.

Further details on this process are described in WO 2019/179800 A1, which is incorporated by reference herein. An indicator material 62 is received inside the capsule 60 and if said indicator material comes into contact with liquid, such as a hydraulic oil, it changes colour to a red warning colour which is clearly perceptible. Further details on this process are also provided in WO 2019/179800 A1.

As shown in FIG. 2 in particular, a sleeve-like depression 64 is provided, coaxially with respect to its longitudinal axis 30, in the upper part of the accumulator housing 10 or accumulator lid 26 respectively, said depression comprising the internal thread 44 on its inner circumference and being furnished with an end wall 66 on its bottom side, said end wall being penetrated by the additional passage point 54. As is particularly evident on the installation drawing shown in FIG. 2, the engagement depth of the depression 64 is selected such that, when the screw plug 32 is fully screwed in between its free lower end face 68 and the base 66 of the depression 64, an axial spacing is formed which is for example able to receive a sealant, which is not shown in further detail. Furthermore, a further sealant, which is not shown, for example in the form of a sealing ring, may be arranged at a transition point in the region of the thread run-out 38 between the screw head 36 of the screw plug 32 and the adjacent upper side of the accumulator housing 10. In addition, it is possible to apply a thin-lipped weld seam as a peripheral weld seam 72 to secure the screw plug 32 in the assigned receptacle of the accumulator housing 10 between the upper side of the accumulator housing 10 and an end region on the edge of the screw head 36, said peripheral weld seam thus also sealing the environment from the receiving space 48 with its widening 58.

With the aforementioned weld seam 72, the gas or medium space 12 can be hermetically sealed with a leak rate of $<1*10^{8}$ mbar 1/s with respect to helium. With the corresponding embodiment, it is also possible to determine the pre-filling pressure in the accumulator housing 10 by precise means after filling and before welding. This therefore has no parallel in the prior art.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A pressure accumulator with an accumulator housing, in which a movable separating element separates a medium space from a fluid space in a fluid-tight manner; wherein a monitoring device is provided and gives a visually perceptible indication when there is a fault that impairs the sealing effect of the separating element, the monitoring device having a viewing window through which it is possible to observe an indicator which is in connection with the medium space and the optical property of which perceptibly changes when it is wetted with the fluid; wherein the monitoring device has a screw plug, which can be screwed with its external thread into an assigned internal thread of the accumulator housing and which has the viewing window and the indicator and also a fluid-permeable shutting-off device, which forms in the screw plug a receiving space partly delimited by the viewing window and intended for receiving the indicator, the shutting-off device spatially separating the receiving space from the interior of the medium space of the accumulator housing, and wherein the indicator can move freely inside the receiving space.

2. The pressure accumulator of claim 1, wherein the screw plug, which is designed as a hollow screw, comprises, at least in the region of a screw head, a receptacle in the form of a truncated cone for receiving the viewing window.

3. The pressure accumulator of claim 1, wherein the viewing window consists of a glass and is metal-fused to the screw plug.

4. The pressure accumulator of claim 1, wherein the glass of the viewing window breaks if a pre-definable target pressure threshold is exceeded, said threshold lying between a test pressure and a bursting pressure, and wherein it disintegrates into extremely small fragments in the event of failure.

5. The pressure accumulator of claim 2, wherein the receptacle in the form of a truncated cone, with the viewing window, transitions into an annular groove-shaped widening in the screw plug, which is part of the receiving space for the indicator.

6. The pressure accumulator of claim 1, wherein the indicator consists of a fluid-permeable capsule, in which an indicator material is received.

7. The pressure accumulator of claim 1, wherein the shutting-off device is formed by a dome-shaped sieve or membrane structure, which is held in position in the screw plug by means of an insert ring.

8. The pressure accumulator of claim 1, wherein the accumulator housing is provided with a pot-like depression that comprises the internal thread on its inner circumferential side.

9. The pressure accumulator of claim 1, wherein an engagement depth of a depression is selected such that, when the screw plug is screwed in, an axial spacing is formed between a free end face of said screw plug and the base of the depression.

10. The pressure accumulator of claim 1, wherein a further sealant is arranged and/or a peripheral weld seam is arranged at a transition point between the screw head of the screw plug and the adjacent upper side of the accumulator housing.

11. A screw plug, comprising the following as integral components in a screw housing:

a viewing window;

an indicator, the optical property of which perceptibly changes when it is wetted with fluid; and a shutting-off device, which is configured to be fluid-permeable and holds the indicator in a receiving space of the screw housing; wherein the indicator can move freely inside the receiving space.

12. The pressure accumulator of claim 3, wherein the viewing window consists of borosilicate glass.

13. The pressure accumulator of claim 2, wherein the viewing window consists of a glass and is metal-fused to the screw plug.

14. The pressure accumulator of claim 2, wherein the glass of the viewing window breaks if a pre-definable target pressure threshold is exceeded, said threshold lying between a test pressure and a bursting pressure, and wherein it disintegrates into extremely small fragments in the event of failure.

15. The pressure accumulator of claim 3, wherein the glass of the viewing window breaks if a pre-definable target pressure threshold is exceeded, said threshold lying between a test pressure and a bursting pressure, and wherein it disintegrates into extremely small fragments in the event of failure.

16. The pressure accumulator of claim 1, wherein the medium space is filled with a working gas.

* * * * *